UNITED STATES PATENT OFFICE

CHRISTOPHER JOSEPH HEALY, OF NEW YORK, N. Y., ASSIGNOR OF THREE-EIGHTHS TO CHARLES BRUECKNER, OF BROOKLYN, NEW YORK, AND ONE-FOURTH TO JAMES HAMILTON, OF EAST ORANGE, NEW JERSEY.

THIN LEAF-LIKE SHEETS AND METHOD OF MAKING THE SAME.

990,261. Specification of Letters Patent. Patented Apr. 25, 1911.

No Drawing. Application filed December 2, 1909. Serial No. 531,050.

*To all whom it may concern:*

Be it known that I, CHRISTOPHER JOSEPH HEALY, a citizen of the United States, residing in the borough of Brooklyn, city of New York, in the county of Kings and State of New York, have invented certain new and useful Improvements in Thin Leaf-Like Sheets and Method of Making the Same, of which the following is a specification.

My invention relates to improvements in compositions of matter and methods of making the same and particularly to compositions of matter for use as leaflike material in the arts; and an object of my invention is to provide a composition of the character described and a method of making the same which will be simple, comparatively cheap and most efficient.

I have discovered that leaflike material may be made from resinous substances, such as resins, gums and copals; and the method by which I treat the resinous substance to produce the leaflike material is as follows: If commercial gum or resin is used, it will be found to contain a certain amount of fatty or greasy substance which should be removed. To do this, the resinous material is reduced to a liquid state by heating it and the resulting liquid is then mixed with a suitable saponifier, such as caustic soda. The soap produced by the resulting reaction is washed away and the resinous substance is thus thoroughly cleansed of the fatty, oleaginous or greasy material which enters as an impurity. The cleansed resin is now allowed to dry and is next dissolved in any suitable solvent, such as alcohol, ether, acetone, amyl acetate, benzole, naphtha, gasolene, benzin, turpentine or a mixture of any two or more of these solvents. To the solution so formed, an oil is added, care being taken that the oil used is compatible with the particular solvent or solvents to which it is added. A suitable non-adherent surface is next prepared to receive the solution so that, when the latter is poured upon the surface, it will spread out in a thin sheet without adhering to the latter. Such a surface is the surface of a two per cent (2%) solution of nitric acid.

When the solution of oil, resinous substance and solvent is poured upon the non-adherent surface, it spreads out in a thin layer, sheet or film which is allowed to dry and is then cut to the size required by the trade.

The leaflike material may be readily given any desired color. For this purpose a suitable coloring matter or pigment is added to the solution of the resinous substance. If the leaflike material is to be colored and opaque, an earthy pigment or coloring substance may be used; while if the leaflike material is to be colored and yet transparent, an anilin coloring substance may be added. If coloring substances are used, the oil used should be such as is compatible with the coloring matter selected. The latter should be such as will mix freely and readily with the oil and solvent to which it is added. As examples of the oils which may be found suitable for use in the preparation of my new leaflike material, the following may be named: essential oils, mineral oils, paraffin oil, fusel oil, linseed oil, castor oil, kidney oil, olive oil and chinawood oil; but any oil compatible with a mixture of spirits and coloring matter may be used. Among the resinous substances which may be used the following may be named: copals, sandarach, mastic, dammar gum, rosi and pitch.

It will be understood that the oil serves to make the solution spread out freely upon the surface of the nitric acid solution (or non-adherent surface); and the volatile solvent used rapidly evaporates, leaving a thin leaflike sheet of resinous substance which is dried, cut in sizes and placed between leaves (as of paper) for safety, but the dried-out leaflike sheet of resinous substance does not, however, necessarily contain oil as an ingredient or constituent.

I claim:

1. The method of making a thin transparent colored leaflike sheet consisting in dissolving a resinous substance in a suitable solvent; adding an oil; introducing an anilin coloring matter; and pouring the mixture thus formed upon the surface of an acid solution.

2. The method of a making a thin colored leaflike sheet consisting in dissolving a resinous substance in a suitable solvent; adding an oil; introducing a coloring matter; and pouring the mixture thus formed upon the surface of an acid solution.

3. A thin leaflike sheet formed by dissolving a resinous substance in a suitable solvent; adding a coloring matter; and pouring the mixture upon a non-adherent surface.

4. A thin leaflike sheet formed by dissolving a resinous substance in a suitable solvent; adding an oil; introducing coloring matter; and pouring the mixture upon a non-adherent surface.

5. A thin transparent colored leaflike sheet formed by dissolving a resinous substance in a suitable solvent; adding an oil; introducing an anilin coloring matter; and pouring the mixture upon a non-adherent surface.

Signed at New York city, New York, this first day of December, A. D. 1909, in the presence of the two undersigned witnesses.

CHRISTOPHER JOSEPH HEALY.

Witnesses:
   CHARLES BRUECKNER,
   JAMES HAMILTON.